Feb. 6, 1951          G. S. STANCU          2,540,841
ELECTRIC TRANSLATING APPARATUS
Filed June 3, 1949
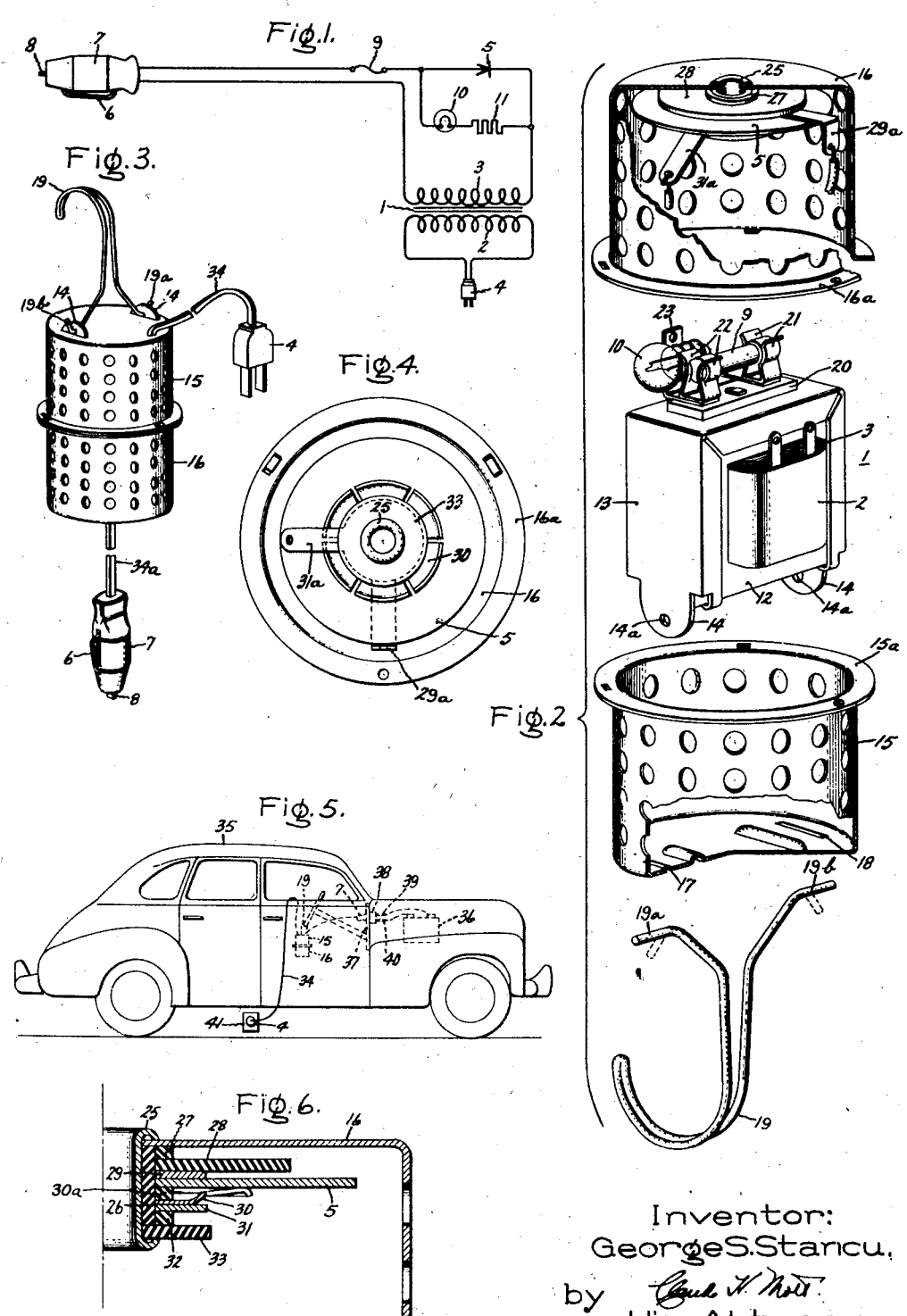
Inventor:
George S. Stancu,
by    *Claude H. Nott*
His Attorney.

Patented Feb. 6, 1951

2,540,841

UNITED STATES PATENT OFFICE 2,540,841

ELECTRIC TRANSLATING APPARATUS

George S. Stancu, Marblehead, Mass., assignor to General Electric Company, a corporation of New York Application June 3, 1949, Serial No. 97,020

2 Claims. (Cl. 321—8)

My invention relates to electric translating apparatus for charging batteries, and more particularly to charging apparatus of dry plate contact rectifying type for trickle charging of automobile or other vehicle batteries when not in use.

It is well known that electric storage batteries of the lead acid type accumulate a coating of lead sulfate on the plates when not in use. This coating materially reduces the efficiency of the battery, and it is known that, in cold weather, the efficiency of the battery is only a small fraction of its normal value, even though the state of charge is not sufficiently low to demand recharging of the battery. In order to overcome this condition of sulfation due to nonuse, and in order to maintain battery efficiency at a high level in cold weather, it is known that a small so-called trickle charge may be supplied to the battery when not in use. Apparatus heretofore known for trickle charging of automobile batteries commonly requires connection directly to the battery terminals and ordinarily includes rectifying apparatus of the mercury vapor arc type. Such apparatus is both expensive and inconvenient to use.

It is a general object of my invention to provide a new and improved trickle charger of the rectifying type which is readily portable and which is arranged for quick and easy connection to the battery circuit of a vehicle.

It is a more specific object of my invention to provide a new and improved automotive battery charger of the dry plate contact rectifying type which is readily connectable to the car battery without necessitating direct connection to the battery terminals.

It is still another object of my invention to provide new and novel means for simply and inexpensively mounting and housing an electrical translating apparatus of the rectifying battery charging type.

In carrying out my invention in one form, I provide a two-part housing formed of a pair of juxtaposed cup-shaped housing members, and including a transformer mounted in one of the members and a dry plate contact rectifier mounted in the other of the cup-shaped members. To facilitate assembly and to reduce cost, the transformer is formed of a stack of rectangular laminations held together by a U-shaped clamping sheath of channel-shaped cross section. The laminations are clamped between the side walls of the channel, and the side arms of the sheath extend beyond the core and protrude through the base of one of the housing members to form a pair of mounting lugs for the entire apparatus. A mounting hanger is hooked through the projecting lugs and serves the dual purpose of holding the transformer in the housing, and providing a mounting for the entire apparatus.

My invention will be more fully understood and its various objects and advantages further appreciated by referring now to the following detailed specification taken in conjunction with the accompanying drawing, in which Fig. 1 is a schematic circuit diagram of a battery charging apparatus embodying my invention; Fig. 2 is an exploded perspective view, partly in section, showing the structure of the apparatus; Fig. 3 is an assembled view of the apparatus; Fig. 4 is a plan view of one end of the housing showing the manner of mounting the rectifier disc; Fig. 5 is an elevational sketch of an automotive vehicle illustrating the manner of connecting my apparatus for charging the vehicle battery; and Fig. 6 is a fragmentary cross-sectional view of one end of the housing showing in detail the rectifier assembly.

Referring now to the drawing, and particularly to Fig. 1, the preferred embodiment of my invention herein illustrated by way of example comprises a transformer 1 having a primary winding 2 and a secondary winding 3. The primary winding 2 is adapted for direct connection to a commonly available source of domestic alternating current supply, such as a 60 cycle, 115 volt source. For making such connection, the primary winding 2 is connected to a suitable plug connector 4 having a pair of prong terminals adapted for insertion in the ordinary house outlet receptacle. The secondary winding 3 of the transformer 1 is arranged to supply a voltage suitable for charging of an electric storage battery, such as the generally used 3-cell lead acid storage battery used in automotive vehicles. One terminal of the secondary winding 3 is connected to one terminal of a dry plate contact rectifier 5, and the other terminal of the secondary winding 3 is connected to a contact 6 of a second plug connecter 7. A second contact 8 of a second plug connector 7 is connected through a fuse 9 to the other terminal of the contact rectifier 5. The plug connector 7 is adaped for connection through the vehicle electrical system to the car battery.

An indicating lamp 10 is connected in series circuit relation with a current limiting resistor 11 across the rectifier 5. The rectifier 5 is of the half-wave rectifying type, so that when charging current is being supplied through the secondary circuit of the transformer 1, the indicating lamp 10 is energized on alternate half cycles when the rectifier 5 is not conducting.

The plug connector 7 is of generally cylindrical configuration and adapted for insertion in the outlet receptacle commonly provided on an automobile dashboard for a cigar or cigarette lighter attachment. Such an automobile outlet receptacle is generally provided with a pair of contact members connected to opposite terminals of the storage battery and is ordinarily used to supply energy for any of a variety of utilization devices, such as cigar lighters, trouble lights, and the like. It is a two-contact general utility outlet receptacle of this type to which the appended claims refer by the term "utility outlet receptacle."

Referring now more particularly to Fig. 2, I have therein illustrated in exploded perspective form a suitable structural arrangement for a battery charging apparatus embodying my invention. Throughout the various figures of the drawing, like parts have been assigned the same reference numerals. Thus, it will be observed at Fig. 2 that the transformer 1 comprises a generally rectangular magnetizable core 12 having a central coil opening within which are disposed the windings 2 and 3. The core 12 is of laminated construction and comprises a plurality of laminations of sheet steel stacked together and clamped by a U-shaped clamping sheath 13 of channel-shaped cross section. The core laminations are clamped between the channel side plates of the sheath, or wrap-around clamp, 13. The side arms of the U-shaped sheath 13 terminate in a pair of extending ears or lugs 14, each of which is apertured at 14a for a purpose which will be more fully described hereinafter.

The housing for the transformer 1 and the rectifier 5 is formed of a pair of similar cup-shaped housing members 15 and 16 having outturned flanges or rims 15a and 16a, respectively, at their open ends, and arranged for assembly in end-to-end alignment with their rims 15a and 16a connected together, thereby to form an elongated, and preferably cylindrical, enclosure. The side walls of the cup-shaped housing members 15 and 16 are perforated to provide cooling for the included apparatus.

The transformer 1 is mounted within the cup-shaped housing member 15, and for this purpose, the end wall of the housing member 15 is provided with a pair of diametrically opposite rectangular slots 17 and 18. The slots 17 and 18 are spaced apart to receive the projecting lugs 14 on the transformer sheath 13, so that when the transformer 1 is positioned in the housing member 15, the projecting lugs 14 extend through the end slots 17 and 18 and beyond the end wall of the housing member 15. The transformer 1 is held in the housing member 15 by a hanger 19, preferably formed of wire and including a pair of hooks 19a and 19b. In assembled position (Fig. 3), the hooks 19a and 19b extend through the apertures 14a in the mounting lugs 14 of the transformer sheath, thereby to hold the transformer 1 in the housing member 15 and simultaneously to provide a supporting hanger for the entire apparatus.

The fuse 9 and indicating lamp 10 are conveniently fixed to the transformer clamping sheath 13, as illustrated at Fig. 2. For this purpose, a strip of insulating material 20 is attached to the transverse or bight portion of the U-shaped sheath 13, and a pair of fuse clips 21, 22 are mounted on the insulating strip. The indicating lamp 10 is mounted in a conducting bracket 23 fixed to the fuse clip 22.

The rectifier 5 is of the dry plate contact type, such as selenium or copper-oxide. Preferably, the rectifier is of the selenium type, and comprises a thin flat disc of aluminum coated on one side with a layer of selenium. This rectifier disc is mounted in the base or cup-shaped housing member 16, as illustrated at Figs. 2 and 4.

Referring more particularly to the cutaway view of the housing member 16 at Fig. 6, the end wall of this housing member is provided with a central aperture in which is positioned a ferrule 25. Surrounding the ferrule 25 is an insulating sleeve 26, which with the ferrule 25 forms an insulating spindle upon which is stacked the rectifier disc 5, the rectifier contact members and the various necessary insulating partitions. As shown at Fig. 6, this stack comprises first an insulating spacer ring 27 adjacent the end wall of the housing member 16, and next an insulating disc 28 adjacent the ring 27. On the opposite side of the insulating disc 28 is disposed a contact ring 29 having a radially extending terminal arm 29a (Fig. 4) for making connection to one side of the rectifier plate 5. Next to the contact ring 29 is disposed the rectifying disc 5, and on the opposite side of the rectifying disc 5 is disposed a slotted resilient metallic contact disc 30 and intermediate insulating spacer 30a. Adjacent the contact disc 30, and in electrical contact therewith, is a second contact ring 31 having a radially extending terminal arm 31a for making electrical contact to the opposite side of the rectifying disc. Finally the stack is completed by an insulating spacer ring 32 next to the contact ring 31 and an insulating disc 33 adjacent the spacer ring 32. The ends of the ferrule 25 are peened over to hold the rectifier assembly in stacked relation, and contact pressure is maintained by the resilient contact plate 30.

At Fig. 6, I have not shown the electrical connections of the various component elements, but it will be understood that the transformer, rectifier, fuse and indicating lamp are connected in the manner indicated schematically at Fig. 1. External lead wires 34 and 34a from the housing 15, 16 are provided, these leads carrying at their ends the plug connectors 4 and 7, respectively. This is indicated in the assembly drawing of Fig. 3. One of the lead wires may suitably be brought out of the casing through the rectifier mounting ferrule 25.

At Fig. 5, I have illustrated the manner in which my battery charging apparatus may be connected to an automobile battery. At Fig. 5, there is shown an automobile 35 having an electric storage battery 36 mounted therein, and provided on the dashboard 37 with a utility outlet receptacle 38 including a pair of electric contact members 39 and 40. At Fig. 5, there is shown also a domestic alternating current supply outlet 41, which may suitably be located in the garage adjacent the automobile. The battery charging apparatus in the housing 15, 16 is mounted in the car by suspension from the hanger 19, such as by hooking the hanger over the steering wheel of the automobile. The plug connector 4 is brought out to the domestic outlet receptacle 41, and the plug connector 7 is inserted in the utility receptacle 38 on the dashboard. As thus connected, the contacts 6 and 8 on the plug connector 7 cooperate with the receptacle contacts 39 and 40 in the receptacle 38 to connect the electric storage battery 36 across the secondary winding of the transformer 1 in series circuit relation with the rectifier 5, thereby to supply unidirectional charging current to the battery.

While I have illustrated and described only a preferred embodiment of my invention, many modifications will occur to those skilled in the art, and I, therefore, wish to have it understood that I intend in the appended claims to cover all such modifications as fall within the true spirit and scope of my invention.

What I claim as new and desire to secure by Letters Patent of the United States is:

1. An electric translating apparatus comprising an enclosing housing including a cup-shaped member, said cup-shaped housing member having a pair of spaced-apart apertures in the base thereof, a transformer positioned in said housing member and including a laminated core and a U-shaped clamping sheath embracing said core and clamping said laminations, each side arm of said U-shaped sheath including an apertured mounting lug extending beyond said core and through said spaced apertures in the base of said one housing member, and means for holding said transformer in said housing and mounting the entire translating apparatus comprising a hanger having a pair of hooks passing through said apertured lugs.

2. A portable battery charger comprising a pair of cup-shaped housing members having their rim portions connected together to form an enclosing housing, one said housing member having a pair of spaced-apart apertures in the base thereof, a transformer positioned in said one housing member and including a rectangular laminated core and a U-shaped clamping sheath of channel-shaped cross section embracing said core with the side channel plates of said sheath clamping said laminations, each side arm of said U-shaped sheath terminating in an apertured mounting lug extending beyond said core and through said spaced apertures in the base of said one housing member, a dry plate rectifier fixedly mounted in the base of the other cup-shaped housing member, and means for holding said transformer in said housing and mounting the entire translating apparatus comprising a hanger having a pair of hooks passing through said apertured lugs outside said housing.

GEORGE S. STANCU.

REFERENCES CITED

The following references are of record in the file of this patent:

UNITED STATES PATENTS

| Number | Name | Date |
| --- | --- | --- |
| 1,610,205 | Fritts | Dec. 7, 1926 |
| 1,787,850 | Wolf | Jan. 6, 1931 |
| 1,954,931 | Hambuchen | Apr. 17, 1934 |
| 1,993,914 | Bohm | Mar. 12, 1935 |
| 2,000,571 | Oswald | May 7, 1935 |
| 2,028,191 | Chereton | Jan. 21, 1936 |
| 2,351,097 | Boeringer | June 13, 1944 |
| 2,485,450 | Kotterman | Oct. 18, 1949 |

OTHER REFERENCES

Electrical Review, October 25, 1946, page 41.
Farm Implement News, September 8, 1949, page 21.